(12) United States Patent
Khan et al.

(10) Patent No.: US 8,277,881 B2
(45) Date of Patent: *Oct. 2, 2012

(54) WHITE REFLECTIVE COATING FOR MODIFIED BITUMEN MEMBRANE

(75) Inventors: Amir Khan, Wayne, NJ (US); Michael De Souto, Somerset, MA (US)

(73) Assignee: Building Materials Investment Corporation, Wilmington, DE (US)

( * ) Notice: Subject to any disclaimer, the term of this patent is extended or adjusted under 35 U.S.C. 154(b) by 683 days.

This patent is subject to a terminal disclaimer.

(21) Appl. No.: 10/851,580

(22) Filed: May 21, 2004

(65) Prior Publication Data

US 2005/0261407 A1 Nov. 24, 2005

(51) Int. Cl.
*B05D 3/02* (2006.01)

(52) U.S. Cl. ....................................... 427/186

(58) Field of Classification Search .................. 524/405, 524/425, 430, 432, 497; 427/186; 106/15.05, 106/287.17, 287.29
See application file for complete search history.

(56) References Cited

U.S. PATENT DOCUMENTS

| | | | |
|---|---|---|---|
| 3,581,779 A | 6/1971 | Sylvia, Jr. | |
| 4,032,491 A * | 6/1977 | Schoenke | 524/68 |
| 4,066,599 A | 1/1978 | Zimmerman | |
| 4,168,179 A * | 9/1979 | Hesseler | 106/278 |
| 4,195,009 A | 3/1980 | Zimmermann | |
| 4,284,470 A | 8/1981 | Bondoc | |
| 4,291,086 A | 9/1981 | Auten | |
| 4,351,873 A | 9/1982 | Davis | |
| 4,390,570 A | 6/1983 | Rehberg | |
| 4,442,148 A | 4/1984 | Stierli | |
| 4,472,243 A | 9/1984 | Bondoc et al. | |
| 4,480,053 A | 10/1984 | Sherno | |
| 4,543,158 A | 9/1985 | Bondoc et al. | |
| 4,567,079 A | 1/1986 | Canfield et al. | |
| 4,588,634 A | 5/1986 | Pagen et al. | |
| 4,745,032 A | 5/1988 | Morrison | |
| 4,749,731 A | 6/1988 | Kyminas et al. | |
| 4,827,686 A * | 5/1989 | Stamper et al. | 52/408 |
| 4,859,723 A | 8/1989 | Kyminas et al. | |
| 4,870,796 A | 10/1989 | Hart et al. | |
| 4,886,554 A | 12/1989 | Woodring et al. | |
| 4,992,315 A | 2/1991 | Zickell et al. | |
| 5,110,674 A | 5/1992 | Grube et al. | |
| 5,258,216 A | 11/1993 | von Bonin et al. | |
| 5,434,009 A * | 7/1995 | Urbanek | 428/489 |
| 5,437,923 A * | 8/1995 | Kalkanoglu | 442/140 |
| 5,580,637 A | 12/1996 | Konta et al. | |
| 5,884,446 A | 3/1999 | Hageman | |
| 5,964,946 A | 10/1999 | Zan Chetta et al. | |
| 6,207,593 B1 | 3/2001 | Fields | |
| 6,245,850 B1 | 6/2001 | Fields | |
| 6,451,378 B1 | 9/2002 | Ennis | |
| 6,487,830 B2 | 12/2002 | Robertson | |
| 6,502,360 B2 | 1/2003 | Carr, III et al. | |
| 6,544,596 B2 | 4/2003 | Clemens et al. | |
| 6,555,162 B1 * | 4/2003 | Takimoto et al. | 427/240 |
| 6,653,356 B2 | 11/2003 | Sherman | |
| 6,872,440 B1 * | 3/2005 | Kiik et al. | 428/141 |
| 7,070,843 B2 * | 7/2006 | Bartek et al. | 428/40.1 |
| 7,070,844 B2 * | 7/2006 | Bartek | 428/40.1 |
| 7,250,187 B2 * | 7/2007 | Domingues | 426/551 |
| 2002/0103283 A1 | 8/2002 | Elfring et al. | |
| 2003/0177705 A1 * | 9/2003 | Forbis et al. | 52/3 |
| 2004/0009319 A1 | 1/2004 | Zan Chetta et al. | |
| 2004/0134378 A1 * | 7/2004 | Batdorf | 106/18.13 |
| 2005/0053746 A1 * | 3/2005 | Bartek | 428/40.1 |
| 2005/0139126 A1 * | 6/2005 | Khan et al. | 106/437 |
| 2005/0145139 A1 * | 7/2005 | Khan et al. | 106/437 |
| 2005/0257875 A1 | 11/2005 | Khan et al. | |
| 2005/0261409 A1 * | 11/2005 | Khan et al. | 524/425 |
| 2005/0277875 A1 * | 12/2005 | Selkee | 604/95.04 |

FOREIGN PATENT DOCUMENTS

WO WO 97/24485 7/1997

* cited by examiner

*Primary Examiner* — Peter Szekely

(74) *Attorney, Agent, or Firm* — Sills, Cummis & Gross P.C

(57) ABSTRACT

A coating composition useful for building materials products, especially roofing surfaces, is provided. The coating composition provides durable exterior protection to surfaces that it applied to, and it has reflective properties. The coating composition includes a mixture of a polymeric binder, a polymeric carrier and a pigment. The pigment is present in the coating composition in amount that is capable of providing a coating that has an initial energy efficiency rating greater than or equal to 0.65 for a low-sloped roof, or an initial energy efficiency greater than or equal to 0.25 for a steep-sloped roof.

14 Claims, 1 Drawing Sheet

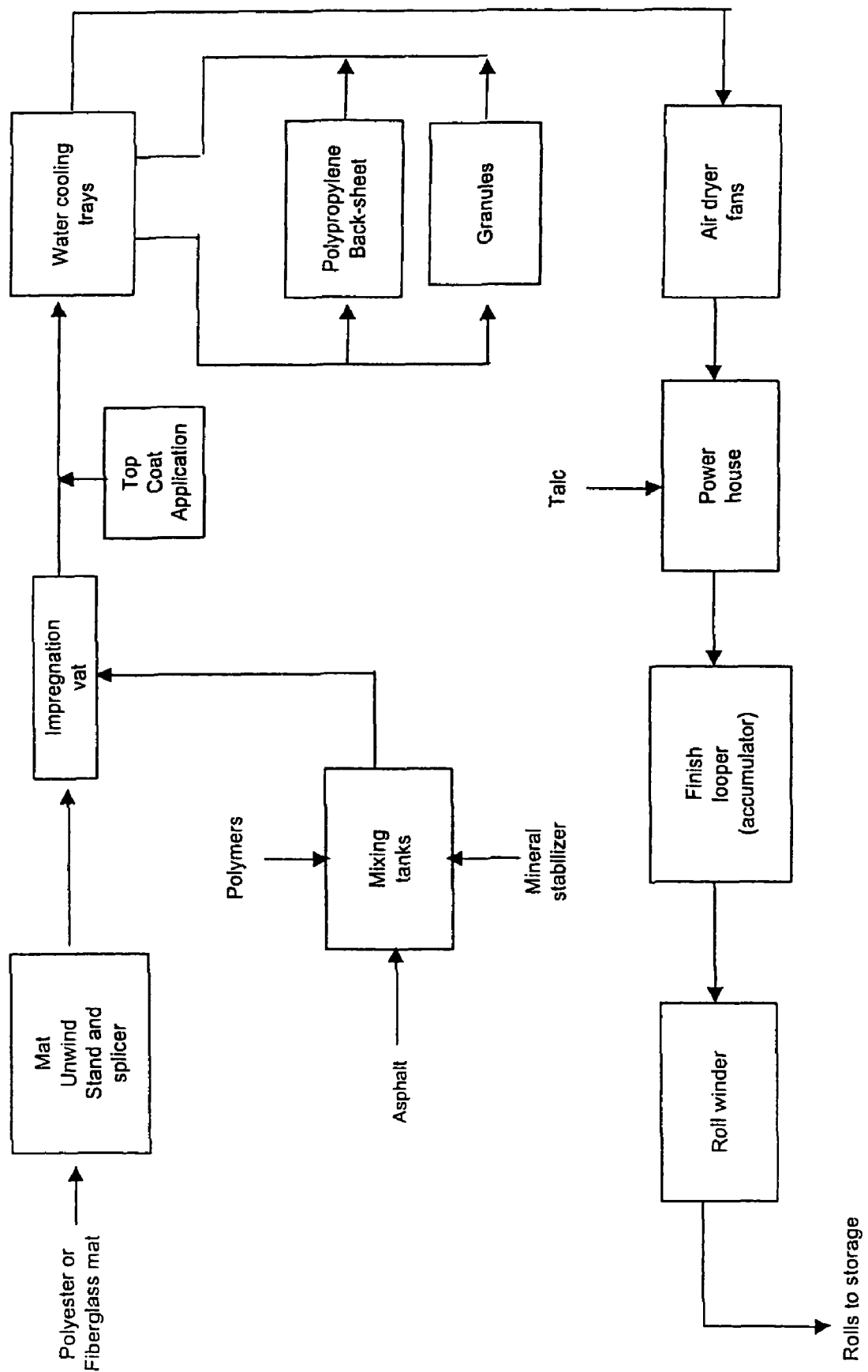

WHITE REFLECTIVE COATING FOR MODIFIED BITUMEN MEMBRANE

The present invention relates to an improved building materials top coating composition, and more specifically, to a top coating composition for roofing products that provides improved energy efficacy, durability, high reflectivity, improved fire rating and is easy to apply.

BACKGROUND OF THE INVENTION

Energy efficient roof systems increasingly are in demand because of rising energy costs, evolving building codes and greater sensitivity to the effects of urban heat islands. Energy-efficient roofing materials result in cooler roof surfaces and less energy spent for air conditioning. From an environmental standpoint, reduced cooling costs translate to reduced fuel usage, less power-plant emissions and fewer particulate matter in the air. Energy efficient roof coatings reduce roof insulation thickness requirements and ceiling plenum construction.

In addition, some energy codes have begun to include minimum requirements for reflectivity and emissivity (i.e., a surface's ability to emit heat). For example, the Cool Roof Rating Council has developed a system to evaluate and label roof coverings using independent testing labs so energy performance values for all roof coverings can be included in energy codes. As a result of this demand and media attention about ENERGY STAR® rating and reflectivity, acrylic coatings have been used as finish coats for modified bitumen roof systems and maintenance coatings for existing roof systems.

White, water-based acrylic coatings have been found to provide the highest reflectivity and longevity. White reflective coatings also typically minimize heat damage to roof membranes, increasing their expected service lives. Acrylic coatings primarily are formulated with pigments, acrylic polymers and water. There may be other additives, such as fibers for reinforcement, glycol for freeze thaw resistance, intumescant or other fire-retardant additives, or biocides to prevent fungal growth in the container. ENERGY STAR® listings are specific to a coating formula. That is, coating formulation changes must be tested and recertified before establishing the ENERGY STAR® listing for that coating.

With prior art white, water-based acrylic coatings problems have occurred in maintaining roof surface reflectivity. Reflectivity decreases the most during the first year of a roof's life. After three years, the rate that reflectivity declines is typically less significant. Changes in reflectivity are primarily related to changes with the coating itself (e.g., coating-erosion or cracking) and/or minimally related to accumulation of particulate matter (e.g., dirt) from atmospheric fallout. Depending on the geographic exposure and how well roof surfaces drain, keeping roof surfaces white and preventing premature failure from cracking and peeling can be a significant challenge and result in major maintenance expenditures for owners. Maintaining reflectivity may involve regular cleaning, regular restoration of reflective coatings, and regular application of biocides and/or fungicides. There remains a need for improved coatings with greater reflectivity, energy efficacy and durability.

Prior art acrylic coatings are applied directly to granule-surfaced modified bitumen roof membranes on new roof systems or as restorative coatings. However, granules are difficult to coat because of their rough, uneven surface areas. Moisture and air pockets can be trapped under the acrylic coating and lead to blisters or pinholes in the cured acrylic coating. Consequently, application of a compatible primer to the granule surface before coating application is required. Inconsistent coverage and potential cracking of areas where the coating is applied too heavily are additional problems related to application of previous acrylic coatings.

Prior art coatings require application to the roofing membrane subsequent to placement of the modified bitumen membranes. Application requires special equipment such as a pressure washer, paddle mixer and spray rig as well as personal protective equipment. Pressure washing removes embedded dirt, chalking, carbon black and poorly adhered material. A paddle mixer is required as the coating must be completely stirred to ensure proper polymer dispersion because the solids may have settled at a container's bottom. Hence, there is a need for coating compositions that can be easily and effectively applied without the need for special equipment.

Acrylic coatings develop strength and adhesion as they cure during installation. When an acrylic coating is applied, two physical changes must occur: water must evaporate from the applied coating film for initial drying and acrylic polymers must fuse together for final cure. Consequently, for application purposes, multiple thin coats promote water evaporation, polymer dispersion, and help eliminate pinholes, voids or thin spots.

Application of water-based acrylic coatings is influenced by changing weather conditions. Virtually all parts of North America have some application limitations as a result of cold weather, daily rainstorms, high humidity and/or fog, or reduced daylight hours during winter. Rain on an uncured coating will cause a partial or total coating run-off. Problems occur when an acrylic coating is specified on a construction project without regard to the time of year the coating is to be installed.

Therefore, two or more successive coats of the coating are often necessary. Further, the drying of the coating is influenced by weather conditions. Cold temperatures and lack of sunlight decrease the freshly applied coating's evaporation. Water in the coating film closest to the membrane diffuses through slowly. Coatings exposed to water conditions during the drying or coating period may soften, lift and debond from the surface. This often requires cleaning of the surface and reapplication of the coating. The final cure takes place during the first few weeks after application and is essential to the coating's long term performance. Wet weather and cooler temperatures inhibit final cure and may inhibit proper fusing. Consequently, acrylic coating applications cannot be attempted on roofing projects from late fall to early spring in most North American areas.

Hence, there is a need for new and improved coating compositions that may be applied in-plant during manufacture of the roll roofing membrane. In particular, a coating composition is needed that is reflective, energy efficient (meeting today's Energy Star® criteria) as well as durable and easy to apply, and which is not vulnerable to the effects of moisture and cold temperatures during the curing process.

SUMMARY OF THE INVENTION

The present invention provides an improved top coating composition for use in roofing products that provides energy efficacy, high reflectivity, durability, improved fire rating, and is easy to apply. The reflectivity provided by the inventive top coating composition, meets today's Energy Star® standards.

The roof coating of the invention is a white coating that adheres well to various roof substrates, particularly modified bitumen membranes and remains adhered even under severe water-ponding conditions.

The resulting coated roof has an initial solar reflectance and a maintained solar reflectance that meets today's Energy Star® criteria.

The energy efficacy of the top coat is determined by its solar reflectance. Solar reflectance by definition is the fraction of solar flux reflected by a surface expressed as a percent or within the range of 0.00 and 1.00.

The top coating composition of the present invention comprises an aqueous dispersion of acrylic whitening agents, flame retardants, a thickening agent, and a polymeric carrier. The composition generally comprises about 30 to about 60 wt. % polymeric binder, about 1 to about 20 wt. % pigment material, and about 2 to about 40 wt % polymeric carrier.

The present invention is also related to the film, i.e. top coat, that is formed from the top coating composition of the present invention as well as roofing products that are coated with the same.

Because the coating has little odor, it can be applied while the building is occupied and in service, with minimal disruption, making the coating ideal for buildings that function as schools, residences, food preparation areas, hospitals and offices.

Alternatively, the coating of the present invention can be applied in-plant during manufacture of the roll roofing-membranes in order to achieve a higher reflectivity. Application in-plant results in greater strength and adhesion to the roofing membrane.

DETAILED DESCRIPTION OF THE INVENTION

As indicated above, the present invention provides a top coating composition or roofing products that provides energy efficacy, durable exterior protection, is highly reflective to solar energy, and is easy to apply. The highly reflective nature of the top coating composition of the present invention can provide a solar reflective coating that minimizes energy expended in air conditioning and levels temperature within a building structure.

The coating composition of the present invention includes a mixture of an aqueous dispersion of whitening agents, flame retardants, a thickening agent, and a polymeric carrier.

The mixture of the present invention has an initial reflectivity of at least 65% ASTM and a solar reflectance of at least 50% after three years exposure.

Modified bitumen roof systems are defined as polymer-modified bitumen membranes and a base sheet, reinforced with plies of fiberglass, polyester or a combination of both.

Reflectivity is defined as the fraction of radiant energy that is reflected from the white roofing substrate. The higher the amount of reflectivity the cooler the roof has the capability of being.

Wet mil thickness is defined as the amount of coating applied to the roofing substrate equal to one thousandth of an inch while the coating is still wet.

The mixture has a solid content of about 65%. More typically, the mixture has a solid content from about 58 to about 70%.

Thermoplastic water dispersible polymers, especially acrylic polymers or copolymers are employed as the polymeric binder of the top coating composition of the present invention. The polymers used may be any thermoplastic (olefin copolymers or polymers), rubbers and in particular thermoplastic elastomers (multiblock copolymers of diolefin and styrene), or, to a lesser extent, thermosetting resins (polyurethanes, epoxy resin, phenol formaldehyde) capable of forming a film. These polymers can be used alone or in mixture. In the latter case, the mixtures of polymers may contain polyolefins, polyvinyl chloride, polystyrene and polyethylene terephthalate.

Suitable thermoplastic polymers include, but are not limited to: acrylic or methacrylic polymers or copolymers, epoxy resins, and polyvinyl acetate.

The thermoplastic polymers are typically present in the resultant mixture in an amount from about 30 to about 60 wt. %; preferably about 40 to about 50 wt. % based on 100% of the total mixture. The actual amount is dependent upon the type of binder used.

The coating composition of the present invention also includes a polymeric carrier. The polymeric carrier employed in the present invention is typically water, mineral spirits, or hot solvents such as toluene or xylene. The preferred polymeric carrier for the present invention is water.

The polymeric carrier is present in the inventive top coating composition in an amount from about 2 to about 40 wt. %; with an amount from about 5 to about 20 wt. % being more typical.

The other component of the inventive top coating composition is a pigment. The pigment employed in the present invention can be any pigment that is capable of providing a highly reflective coating after the resultant mixture is cured. Typically, the pigment provides a coating that is white in color. Various shades of white are also possible as well as other colors that are capable of providing a coating that is highly reflective.

Suitable pigments that can be employed in the present invention include, but are not limited to: titanium dioxide, calcium carbonate, colemanite, aluminum trihydride (ATH), borate compounds, and mixtures thereof. One highly preferred pigment employed in the present top coating composition is titanium dioxide, which produces a white color. The coating can be formulated in a variety of colors to conform to building asthetics.

The pigments are employed in an amount from about 1 to about 20 wt. %, with an amount from about 4 to about 15 wt. % being more typical for one of the aforementioned pigments.

The ratio of pigment to binder of the coating formulation is in the range of about 1:5 to 1:10, preferably 1:6.5 to 1:8.5.

The energy efficacy of the coating is determined by measuring its initial solar reflectance using ASTM E903 (Standard test method for solar absorptance, reflectance, and transmission of materials using integrated spheres). Alternatively, the initial solar reflectance can be determined by ASTM C 1549 (Standard test method for determination of solar reflectance near ambient temperature using a portable reflectometer).

In addition to having the aforementioned initial solar reflectance values, the coating of the present invention needs to be capable of maintaining a solar reflectance for three years after installation on a low-sloped roof under normal conditions of greater than or equal to 0.50 (measured from the first year after installation). For steep-sloped roofing products, the top coating of the present invention has to maintain a solar reflectance for three years after installation under normal conditions of greater than or equal to 0.15 (measured from the first year after installation).

Maintenance of solar reflectance of a roofing product can be determined using the current guidelines mentioned in the Energy Star® program requirements manual. The test can be carried out using ASTM E 1918 or ASTM C 1549 for low-sloped roofing products. ASTM C 1549 can be used in the case of steep-sloped roofing.

The compositions of the present invention may be thickened using conventional coating thickeners as desired. For example, cellolosic thickeners such as methyl cellulose and hydroxyethylcellulose may be used. Preferred are clay-based thickeners such as attapulgite or bentonite clays. A clay-based thickener also improves the waterproofing (e.g. increases ponding resistance) and fire resistance capabilities of the coating, and hence the roof system.

The amount of thickener employed depends upon the pigment/binder ratio of the composition, the type and grade of thickener used and the application technique to be used.

The coating composition of the present invention includes a flame retardant. The flame retardant is typically present in the resultant mixture in an amount from about 5 to about 50 wt. %, with an amount from about 15 to about 35 wt. % being more typical.

The coating composition of the present invention, which comprises a mixture of at least the above-mentioned components, may also include other optional components that are typically employed in top coating compositions. For example, the coating composition of the present invention can include any of the following components:

dispersants such as potassium tripolyphosphate, acrylic polymers or copolymers, and the like;
defoamers that are capable of preventing foaming;
fillers such as calcium carbonate, talc, white sand, colemanite and the like;
solvents that are capable of serving as a coalescing agent such as ethylene glycol, propylene glycol, alcohols, and the like; preferred is ester alcohol which is a slow evaporating, water-insoluble coalescing aid.
microbiocides that serve as fungicides, e.g., zinc oxide;
thickening agents such as hydroxethyl cellulose, polyurethane, and the like;
additional fire retardants such as alumina trihydrate, zinc borate, alkali metal silicates, and the like;
pH modifiers such as aqueous ammonia;
wetting agents such as siloxanes;
light stabilizers such as hindered amines; and/or
adhesion promoters such as hydrocarbon resins.

The optional components mentioned above are present in the coating composition of the present invention in amounts that are well known to those skilled in the art.

The coating composition of the present invention is prepared by first providing an aqueous dispersion of at least the polymeric binder, the polymeric carrier, the pigment and the other optional ingredients while maintaining constant mixing. Mixing occurs using any mixing apparatus that can operate under low sheer conditions. By "low sheer" it is meant a mixing speed of about 60 rpm or less, which speed is capable of providing and maintaining a homogeneous mixture.

The mixing provides a blend (or emulsion) of components that can be applied immediately to a surface of a building materials product or the resultant mixture can be stored for several weeks or months prior to application.

The resultant top coating composition of the present invention can be applied to any substrate, especially roofing products or other related building materials products, by brushing, roller coating, spray coating, dip coating, squeegee and other like coating procedures. After applying the coating composition of the present invention to a surface of a substrate, the coating composition is cured at the temperature of the environment in which the coated substrate is located. Curing can take place in just a few minutes or longer depending on the thickness of the applied coating as well as the environmental temperature.

The coating composition of the present invention is generally applied to the exterior surface of a substrate. In particular, the coating composition is generally applied to an expose exterior surface of a roofing product including low-sloped roofing products such as single ply membranes, built-up roofing (BUR), modified bitumen, ethylene propylene diene monomer (EPDM) rubber and standing-seam profile metal roofing, or steep sloped roofing products such as composite shingles, clay, concentrate, fiber cement tile, slate, shakes, architectural profiled metal and individual roofing components. In some preferred applications, the coating composition of the present invention is applied to BUR surfaces, modified bitumen and EPDM rubber.

After application and curing, a top coat is provided to the substrate that provides durable protection to the substrate from abrasion, impact, water, and other environmental factors. Moreover, the top coat provided by the present invention is capable of extending the lifetime of the current roofing system. The top coat provided in the present invention is also breathable meaning that it has excellent porosity, which allows for venting of vapors.

In addition to the foregoing properties, the top coat that is formed using the inventive composition has a high reflectivity that meets and even may exceed current Energy Star® values.

The following tables provide exemplary coating compositions of the present invention which provide durable exterior protection to the surfaces they are applied to. The exemplary coating compositions of the present invention also exhibit superior fire-resistance and are highly reflective.

TABLE 1

Coating Composition A

| Raw Materials | Description/used as | % |
|---|---|---|
| Water | polymeric carrier | 2-40 |
| Potassium tripolyphosphate | dispersant | 0.1-0.6 |
| Sodium salt of carboxylic acid | dispersant | 0.1-7.0 |
| Oil-based defoamer | foam protection | 0.1-7.0 |
| Acrylic polymer | binder | 5-60 |
| Clay-based thickener | thickener | 0.1-7 |
| Ester alcohol | coalescing agent | 0.5-7.0 |
| Alumina trihydrate | fire retardant | 5-45 |
| Microbiocide | fungicide | 0.1-4 |
| Titanium dioxide | pigment | 2-20 |
| Zinc borate | fire retardant | 1-10 |
| Zinc oxide | fungicide | 0.1-4 |

Viscosity: 500 cps to 20K cps. Preferably 1000-1800 cps
Volume solids: 65% by weight (range 60-67%)
Density: 10.974 (range 10-11.5) lbs./gal.
Color: White The optional components mentioned above are present in the coating composition of the present invention in amounts that are well known to those skilled in the art.

While the acrylic coating of the present invention is directed to modified bitumen roof membranes, such as APP and SBS polymer modified bitumens, it is understood that it may be applied to other roof systems such as, but not limited to, granule- and mineral-surfaced modified bitumen cap sheets, metal roof systems, masonry surfaces, build-up roof (BUR) systems (BUR systems consist of bitumen and ply sheets applied in multiple layers, hence the term "built-up"), EPDM, PVC, Hypalon® and substrates such as spray polyurethane foam (SPF).

The coating can be applied in a liquid state at a specified application rate which results in a coating thickness of between about 0.1 to 0.9 mm (4 to 36 mils). For all application purposes, the coating can be applied with more than one coat, in two thin coats or one thick coat.

The coating may be applied by spray, brush or roller. A spray pump capable of developing 1,800-psi material output pressure should be sufficient to spray the coating of the present invention. Alternatively, hydraulic or pneumatic pumps may be used.

The coating of the present invention may be used with or without surface priming.

The coating may be applied to the roof and cured in situ or "manufactured in place" or may be prepared in-plant. When prepared in-plant, the coating is applied to the roofing membrane, wound in spiral rolls and cut to appropriate sizes.

Example 1

The water is charged into a mixing vessel. To this is added the additional raw materials.

A roof coating formulation was prepared as set forth in Table 2.

TABLE 2

| Material | Material type | Amount Wt % | Range± | Preferred Range± |
|---|---|---|---|---|
| Water | Solvent | 10.55 | 10 | 2 |
| KTPP (1) | Dispersant | 0.24 | 7 | 1 |
| Tamol 850 (2) | Dispersant | 0.24 | 7 | 2 |
| Foamaster VL (3) | Oil-based defoamer | 0.48 | 7 | 2 |
| Benaqua 4000 (4) | Clay-based thickener | 0.20 | 7 | 2 |
| Lypocryl MB 3640 (5) | Acrylic polymer | 48.04 | 10 | 4 |
| Ti-Pure R-960 (6) | Pigment | 5.77 | 5 | 2 |
| 632CM (7) | Fire retardant | 29.05 | 8 | 4 |
| Firebrake ZB (8) | Fire retardant | 2.39 | 7 | 2 |
| Kadox 915 (9) | Pigment/mildewstat | 0.47 | 7 | 2 |
| Ammonia aqua (10) | Base | 0.14 | 7 | 2 |
| BYK 346 (11) | Defoamer | 0.20 | 7 | 2 |
| Texanol (12) | Coalescent | 1.92 | 7 | 2 |
| Nopco DSX1514 (13) | Polymeric thickener | 0.04 | 7 | 1 |
| Skane M-8 (14) | Biocide | 0.27 | 4 | 2 |
| TOTAL | | 100.00 | | |

(1) Potassium tripolyphosphate (FMC)
(2) Sodium salt of carboxylic acid (Rohn & Haas Company, Philadelphia, PA)
(3) Cognis Corporation
(4) Rheox/Elementis
(5) E. I. Dupont de Nemours & Co., Wilmington, DE
(6) Titanium dioxide (E. I. Dupont de Nemours & Co., Wilmington, DE)
(7) Alumiuna trihydrate (Huber)
(8) Zinc borate hydrate (U.S. Borax Inc.)
(9) Zinc oxide (U.S. Zinc)
(10) 28% aqueous ammonia solution (Boremco)
(11) Dimethyl-polysiloxane polyether (BYK Chemie)
(12) Ester alcohol (Eastman Kodak, Rochester, NY)
(13) Henkel
(14) Isothiazoline microbiocide (Rohm and Haas Company, Philadelphia, PA)

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

BRIEF DESCRIPTION OF THE DRAWING

FIG. 1 represent the flow-chart of the coating process.

The invention claimed is:

1. A method of manufacturing a modified bitumen roofing membrane, the method comprising:
providing an aqueous dispersion of a polymeric binder, a polymeric carrier and an effective amount of a pigment that is capable of providing a coating that has an initial energy efficacy rating greater than or equal to 0.65 for a low-sloped roof, or an initial energy efficacy greater than or equal to 0.25 for a steep-sloped roof;
maintaining constant mixing of the aqueous dispersion under low shear conditions of about 60 rpm or less to create a top coating composition;
applying said top coating composition in-plant to an exterior surface of a modified bitumen substrate during manufacture of the roofing membrane; and
curing said top coating composition at the temperature of the environment in which the coated substrate is located.

2. The method of claim 1 wherein the polymeric binder is a thermoplastic polymer selected from the group consisting of acrylic or methacrylic polymers or copolymers, epoxy resins, and polyvinyl acetate.

3. The method of claim 1 wherein the polymeric carrier is water or a hydrocarbon solvent.

4. The method of claim 1 wherein the pigment comprises titanium dioxide, calcium carbonate, colemanite, aluminum trihydrate (ATH), borate compounds or mixtures thereof.

5. The method of claim 1 where the pigment is titanium dioxide.

6. The method of claim 1 wherein the polymeric binder and the polymeric carrier form an aqueous polymeric-based emulsion.

7. The method of claim 1 wherein the polymeric binder and the polymeric carrier form a solvent polymeric-based emulsion.

8. The method of claim 1 wherein the polymeric binder is present in said mixture in an amount from about 30 to about 60 wt. %.

9. The method of manufacturing a roofing membrane of claim 1 wherein the polymeric binder is an acrylic polymer that is present in said mixture in an amount from about 30 to about 60 wt. %.

10. The method of claim 1 wherein the polymeric binder is an acrylic polymer that is present in said mixture in an amount from about 40 to about 50 wt. %.

11. The method of claim 1 wherein the pigment is present in said mixture in an amount from about 1 to about 20 wt. %.

12. The method of claim 1 further comprising the addition of one or more optional components selected from the group consisting of dispersants, defoamers, fillers, solvents, microbiocides, thickening agents, coalescent agents, fire retardants, pH modifiers, wetting agents, light stabilizers, and adhesion promoters.

13. A method of manufacturing a modified bitumen roofing membrane, the method comprising:
(1) mixing the following ingredients as an aqueous dispersion under low shear conditions of about 60 rpm or less to create a top coating composition:
(a) 2-40% water;
(b) 0.1-0.6% potassium tripolyphosphate;
(c) 0.1-7.0% sodium salt of a carboxylic acid;
(d) 0.1-7.0% oil-based defoamer;
(e) 5-60% binder;
(f) 0.1-7% thickener;
(g) 0.5-7.0% coalescing agent;
(h) 5-45% alumina trihydrate;
(i) 0.1-4% microbiocide;
(j) 1-10% zinc borate;
(k) 0.1-4% zinc oxide;

(1) an effective amount of titanium dioxide that is capable of providing a coating that has an initial energy efficacy rating greater than or equal to 0.65 for a low-sloped roof, or an initial energy efficacy greater than or equal to 0.25 for a steep-sloped roof; and
(2) applying said top coating composition in-plant to an exterior surface of a substrate during manufacture of the roofing membrane.

14. The method of claim 13, further comprising:
(3) curing said top coating composition at the temperature of the environment in which the coated substrate is located.

* * * * *